UNITED STATES PATENT OFFICE.

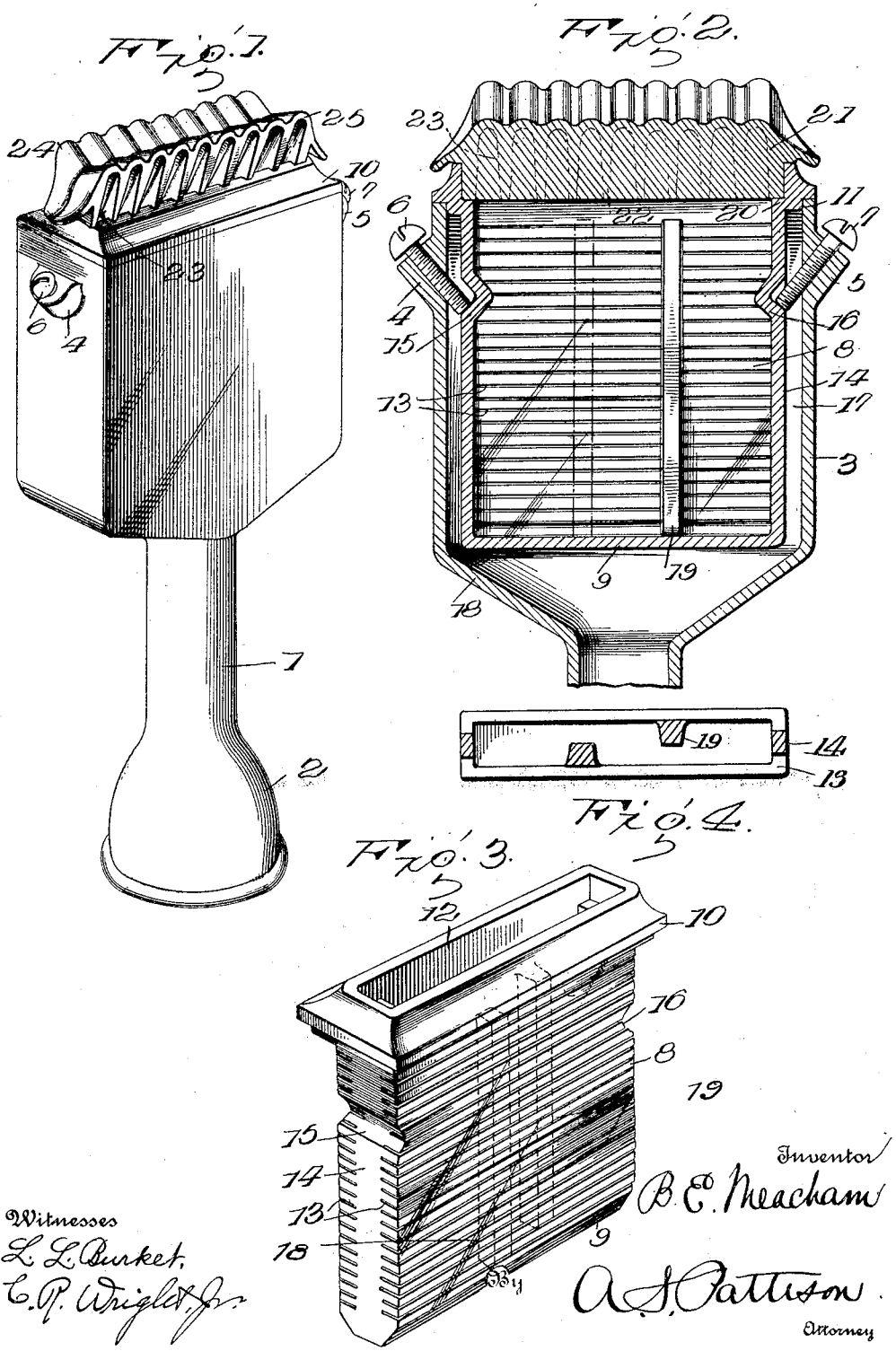

BENJIMAN EDWARD MEACHAM, OF LORAIN, OHIO, ASSIGNOR TO AMERICAN STOVE COMPANY, OF ST. LOUIS, MISSOURI, A CORPORATION OF NEW JERSEY.

GAS-BURNER.

1,108,773.   Specification of Letters Patent.   Patented Aug. 25, 1914.

Application filed September 29, 1913. Serial No. 792,491.

*To all whom it may concern:*

Be it known that I, BENJIMAN E. MEACHAM, a citizen of the United States, residing at Lorain, in the county of Lorain and State of Ohio, have invented certain new and useful Improvements in Gas-Burners, of which the following is a specification, reference being had therein to the accompanying drawing.

This invention relates to improvements in gas burners.

The object of the invention is to provide a burner in which the air and gas are more thoroughly mixed and at the same time absolutely preventing the flame from working downwardly within the burner and burning within the mixing chamber.

Another object of the invention is to provide a simple, cheap and more effective burner having certain details of structure and combination of parts hereinafter more fully set forth.

In the accompanying drawings—Figure 1 is a perspective view of the improved burner. Fig. 2 is a longitudinal vertical sectional view of Fig. 1. Fig. 3 is a perspective view of the mixing chamber removed. Fig. 4 is a vertical transverse sectional view.

The invention is designed more especially for automatic water heaters and consists of a combined air and gas supply tube 1, having at its lower end a large mouth portion 2, into which the gas supply pipe is adapted to extend and around the said gas supply pipe is arranged the usual shutter by means of which the amount of air passing to the tube 1 is regulated, all of which is well understood by those skilled in the art and needs no further description.

The outer end of the tube 1 is provided with an enlarged housing 3, which as shown is rectangular in form and having at its ends the enlarged portions 4 and 5, through which the screws 6 and 7 pass for the purpose hereinafter more fully described. The housing 3, as heretofore stated, is of the rectangular form and made of a solid casting. Fitting within the said housing 3 is a rectangular-shaped mixing chamber 8 having a solid lower reduced bottom 9. The upper end of the mixing chamber 8 is provided with an enlarged flanged portion 10, adapted to rest upon the upper end of the housing 3. The said enlarged upper end of the mixing chamber is provided with a flange 11, which engages the inner face of the housing, to center the mixing chamber within the housing away from the walls thereof, as clearly shown in Fig. 2 of the drawings.

The upper end of the mixing chamber is opened as indicated at 12, and each side below the open upper end is provided with longitudinally extending horizontal slots 13, which communicate with the interior of the mixing chamber and also extend through a portion of the ends 14 of the mixing chamber. The ends 14 of the mixing chamber, as shown in Figs. 2 and 3, adjacent their upper ends, are provided with the inwardly depressed portions 15 and 16 into which the lower ends of the screws 6 and 7 pass, whereby the mixing chamber is rigidly held within the housing 3 and having a space 17 entirely surrounding the mixing chamber.

The inner walls of the mixing chamber 8 are provided with the vertical ribs 18 and 19. The rib 18 extends from one wall of the mixing chamber from the lower end to a point adjacent the upper end and is of a width to extend about half way across the interior of the mixing chamber. The rib 19 is carried by the opposite side wall of the mixing chamber and arranged in precisely the same manner as the rib 18.

The upper solid portion of the mixing chamber at each end is provided with an inwardly extending flange 20, upon which rests the distributing head 21. This distributing head, as shown, consists of a main body portion 22 having the vertical slots 23 and said body-portion extends within the opening 12 in the upper end of the mixing chamber. The distributing head, above the body-portion, is provided with the two outwardly flared portions 24 and 25, which are in communication with the vertical slots 23 in the body-portion. The upper face of the distributer head is V-shaped in cross-section and corrugated, as clearly shown in Figs. 1 and 2 of the drawings. By this arrangement it will be seen that the gas in the mixing chamber passes upwardly through the slots 23 in the flared portions of the distributer head, which causes it to travel outwardly as will be readily understood.

The gas enters through the tube 1, as heretofore described, and fills the housing 3 and passes inwardly through the horizontal arranged slots 13 to the interior of the mixing chamber. It then passes upwardly through the mixing chamber and out through the slots 23, as heretofore described. From this structure it will be seen that the flame is prevented from creeping back into the mixing chamber by the distributer head, but if, for any reason, should the gas become ignited in the mixing chamber, it could not possibly work its way through the slots in the chamber and burn the gas within the housing.

Having thus described the invention, what is claimed and desired to be secured by Letters Patent is:

1. A gas burner comprising a housing, having an open upper end, a mixing chamber supported by the upper edge of the housing, and extending therein and spaced from the sides thereof, and having inlet openings adapted to receive the gas from the housing.

2. A gas burner comprising a housing having an open upper end, a combined air and gas supply for the lower end of the housing, a mixing chamber supported by the upper edge of the housing and extending therein, and spaced from the walls thereof and having horizontally arranged openings in its two opposite walls and adapted to allow the gas to pass within the mixing chamber from the housing.

3. A gas burner comprising a housing having an open upper end, a mixing chamber removably supported by the upper edge of the housing and spaced therefrom, and having horizontally arranged openings and adapted to allow the gas to pass from the housing into the mixing chamber.

4. A gas burner comprising a housing having an open upper end, a combined air and gas supply for the lower end of the housing, a mixing chamber extending within the upper open end of the housing and spaced therefrom and having horizontally arranged openings adapted to allow the gas to pass from the housing into the mixing chamber and a distributer head within the upper end of the mixing chamber.

5. A gas burner comprising a housing having an open upper end, a combined air and gas supply for the lower end of said housing, a mixing chamber resting upon the upper end of the housing and extending within the same and spaced therefrom, means for removably securing the chamber within the housing, said chamber having horizontal slots in its sides to allow the gas to pass from the housing into the mixing chamber, and a distributer head closing the upper end of the mixing chamber.

6. A gas burner comprising a housing having an open upper end, a combined air and gas supply for the lower end of the housing, a mixing chamber supported by the upper end of the housing and spaced from the sides of the housing, said mixing chamber having an open upper end, the ends of the mixing chamber having recesses therein, screws carried by the housing, and passing obliquely thereto and entering the said recesses, and a distributer head within the open upper head of the mixing chamber, substantially as shown and described.

7. A gas burner comprising a housing having an open upper end, a combined air and gas supply for said housing, a mixing chamber supported by the upper end of the housing and extending within the same and of a shape to correspond therewith, means for removably securing the mixing chamber within the housing, said mixing chamber having horizontally arranged slots in its sides and vertical ribs carried by the inner face of the side walls of the mixing chamber and extending to the center of the mixing chamber, said mixing chamber having an open upper end and a distributer head removably supported in the open upper end of the mixing chamber.

8. A gas burner comprising a housing having an open upper end, a combined air and gas supply for the lower end of said housing, a mixing chamber having an open upper end resting upon the upper end of the housing and extending within the housing and spaced therefrom, said mixing chamber having horizontally arranged slots in its sides to allow the gas to pass from the housing inwardly into the mixing chamber.

9. A burner comprising a housing having an open upper end, a combined air and gas supply for said housing, a mixing chamber having open upper ends resting upon the upper end of the housing and having a body portion extending within the housing and spaced therefrom, means for removably securing the mixing chamber within the housing and said mixing chamber having its side walls provided with a series of horizontally arranged slots communicating with the interior of the mixing chamber to allow the gas to pass from the housing inwardly into the mixing chamber.

10. A gas burner comprising a housing having an open upper end, a combined air and gas supply for the lower end of the housing, a mixing chamber extending within the upper open end of the housing and spaced therefrom, and having openings adapted to allow the gas to pass from the housing into the mixing chamber, and a distributer head within the upper end of the mixing chamber.

11. A gas burner comprising a housing having an open upper end, a combined air and gas supply for the lower end of the housing, a mixing chamber extending within the upper open end of the housing, and spaced therefrom, means for removably securing the mixing chamber within the housing, said mixing chamber having openings adapted to allow the gas to pass from the housing into the mixing chamber, and a distributer head removably supported within the upper end of the mixing chamber.

In testimony whereof I hereunto affix my signature in the presence of two witnesses.

BENJIMAN EDWARD MEACHAM.

Witnesses:
C. E. VAN DEUSEN,
B. A. SANFORD.